Oct. 18, 1966   H. A. DETHMAN   3,279,721
BEARING ARRANGEMENT FOR VARIABLE SWEEP WING AIRCRAFT
Filed Oct. 30, 1964   5 Sheets-Sheet 1

INVENTOR.
HERMAN A. DETHMAN
BY
AGENT

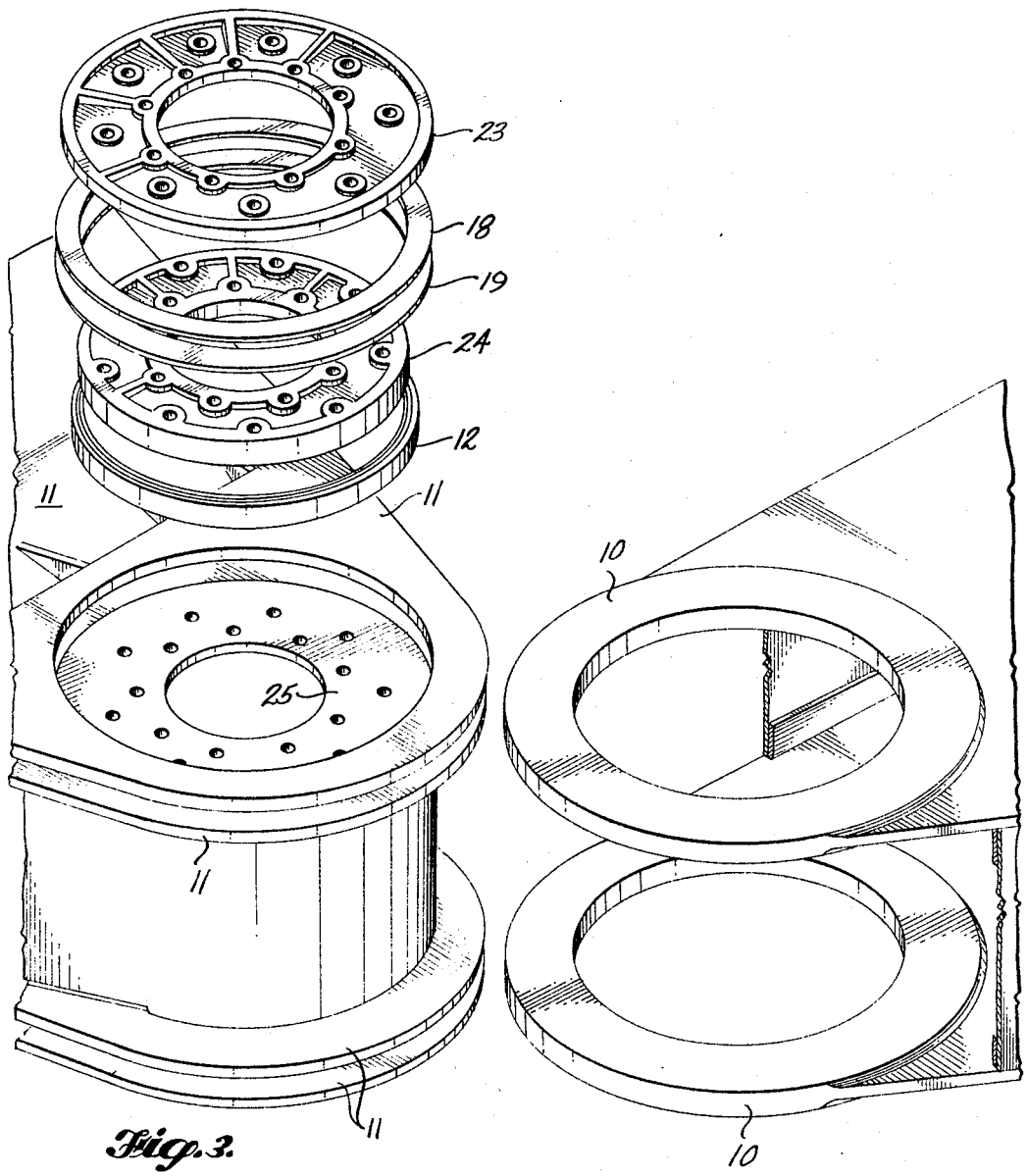

INVENTOR.
HERMAN A. DETHMAN
BY
AGENT

INVENTOR.
HERMAN A. DETHMAN
BY
AGENT 3,279,721
BEARING ARRANGEMENT FOR VARIABLE
SWEEP WING AIRCRAFT
Herman A. Dethman, Bellevue, Wash., assignor to The
Boeing Company, Seattle, Wash., a corporation of
Delaware
Filed Oct. 30, 1964, Ser. No. 407,678
10 Claims. (Cl. 244—46)

This invention relates to bearings capable of handling heavy loads but more particularly relates to a bearing arrangement for providing variable sweep to airplane wings.

In the design of the latest airplanes with their very high speeds, it has been proven that variable sweep wings would solve various problems, especially when an airplane passes from the subsonic region to the transonic region and further to the supersonic region or flight.

A prime advantage of a variable wing is that it provides high lift-drag ratios ($L/D$), on the order of 20, and high lift coefficient at subsonic speeds. These permit landing approaches at relatively lower power settings and with angles of attack corresponding to those for present jet airplanes.

In order to have a wing with a variable sweep so that folding at various speeds in various positions can be done, a reliable and absolutely fail safe bearing system is necessary and furthermore, a bearing system is required which can take most of the loads into one pivot point.

The present invention discloses the novel way to accomplish this requirement and has been thoroughly tested as being feasible and most reliable.

This system has a double bearing jointed at top and bottom of the wing upper and lower surface and the joint itself is a massive one, presently measuring about 36 inches in diameter. Either bearing joint can handle the full load of the outboard surface. Exhaustive tests on the system indicated that the bearing may outlast the plane. The bearing is provided with 0.01–0.02 inch thick, self lubricating liners of a Teflon Fiberglas material. Each joint has one bearing rotating inside of another.

The system will always rotate on the bearing surface having the lowest friction coefficient, whereby if the bearing were to seize the joint would pivot on the other bearing surface. Tests of a series of bearings took a minimum of 25,000 full load cycles before failure, with some lasting up to 70,000 cycles. Failure in these cases did not mean cessation of operation, but rather that the clearance was no longer acceptable.

It is an object of the present invention to provide a bearing for a variable sweep wing which allows for self alignment of the bearing by the use of spherical bearing elements.

It is another object of the present invention to provide a bearing system wherein the load bearing element surfaces are so arranged that a spherical bearing element carries the radial loads without effect of thrust load.

It is another object of the present invention to provide a bearing arrangement wherein the spherical bearing carries the radial loads and a thrust bearing element mounted in a plane normal to the axis of rotation of the spherical bearing element carries the thrust loads.

For a better understanding of the invention, together with other objects thereof, reference should now be made to the following detailed description which is to be read in conjunction with the accompanying drawings in which:

FIGURE 3 is an isometric illustration showing the inboard or female wing section disconnected from the outboard or male wing section. The outboard or male wing section is the part that turns in the various positions and carries the wing to the subsonic, transonic or supersonic location.

Figure 7:
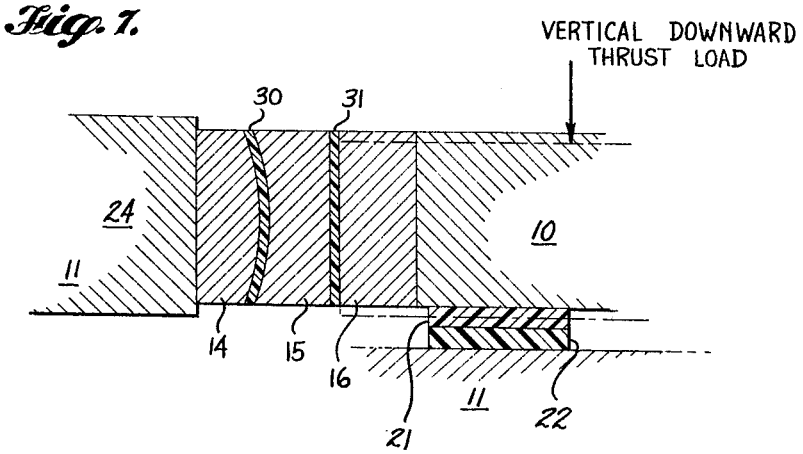

FIGURE 7 presents an enlarged view of the races and liners and exaggerates in dashed lines the effect of a downward thrust load on the radial load liner arrangement.

Figure 1:
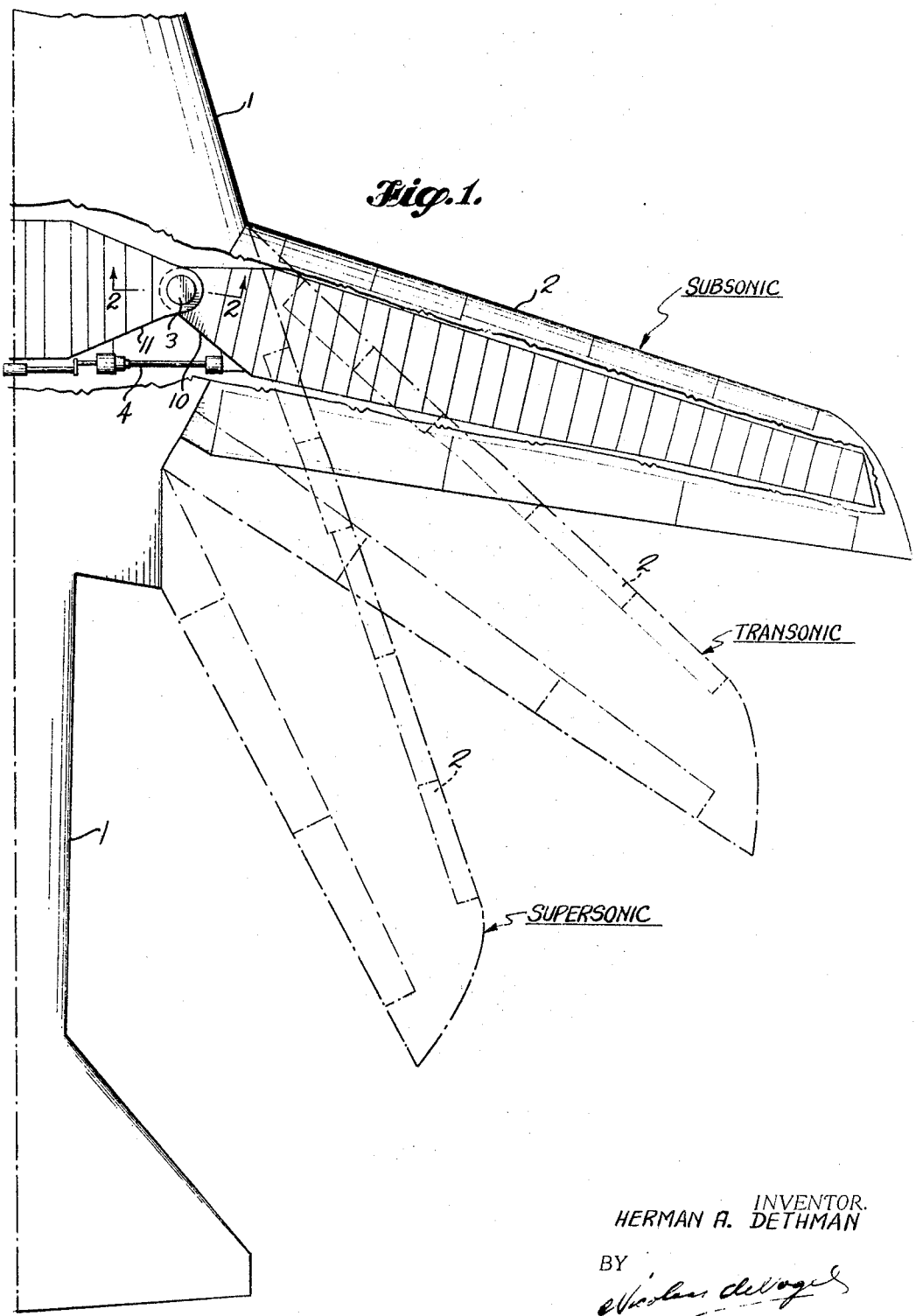
FIGURE 1 is a plan view of the right wing and part of a body section of a supersonic airplane and wherein the actuator means for positioning the variable sweep wing in a subsonic position, transonic or supersonic position is shown.

Referring now to the drawings, wherein like reference characters designate corresponding parts throughout the several views, there is shown in FIGURE 1 a part of a supersonic airplane 1 having a wing 2, pivotally mounted by pivot 3. Actuator means 4, which is remotely controlled by the pilot of the supersonic airplane 1, enables the variable sweep wing 2 to be located in the subsonic, transonic, and supersonic positions as shown.

Figure 2:
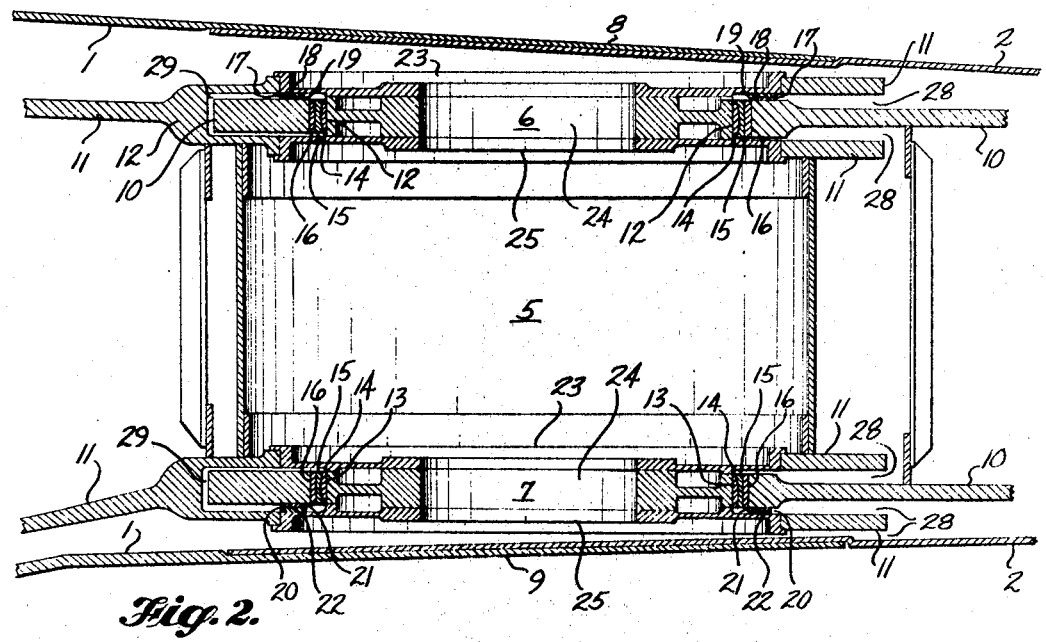
FIGURE 2 is a sectional view taken over the pivot point shown in FIGURE 1. The bearing system shown herein comprises an upper bearing arrangement and a lower bearing arrangement located respectively at the upper wing area and lower wing area surface.

FIGURE 2 illustrates a section of pivot 3 taken across line 2—2 of FIGURE 1. The bearing system 5 comprises an upper bearing arrangement 6 and a lower bearing arrangement 7 being in parallel relationship with one another. An upper fairing surface 8 and a lower fairing surface 9, each comprising two sliding, overlapping skin sections enclose the bearing system 5 within the wing 2 structure. The variable sweep wing 2 is shown partly in cross-section representing an outboard movable male section 10, while the stationary section is represented by the inboard or female section 11. The radial load liner arrangements 12 and 13 comprises a spherical race 14, a free rotating race 15 and a cylindrical race 16. The upper bearing arrangement comprises also a thrust bearing arrangement 17 having a first and second thrust liners 18 and 19 and the lower bearing arrangement 7 comprises a bottom thrust bearing arrangement 20 having a first and second liners 21 and 22.

The radial load liner arrangements 12 and 13 as well as the thrust bearing arrangements 17 and 20 and are enclosed by a structure comprising an upper bearing plate 23, a center bearing plate 24 and a lower bearing plate 25.

In FIGURE 3 there is shown an inboard portion or female section 11 which comprises the bearing plate arrangements 23, 24 and 25 and the male section 10 shown in a disconnected relationship in regard to the female section 11. This illustration of the two sections 10 and 11 is purposely done in order to clarify the moveable 10 and stationary 11 sections in this bearing arrangement.

Figure 4:
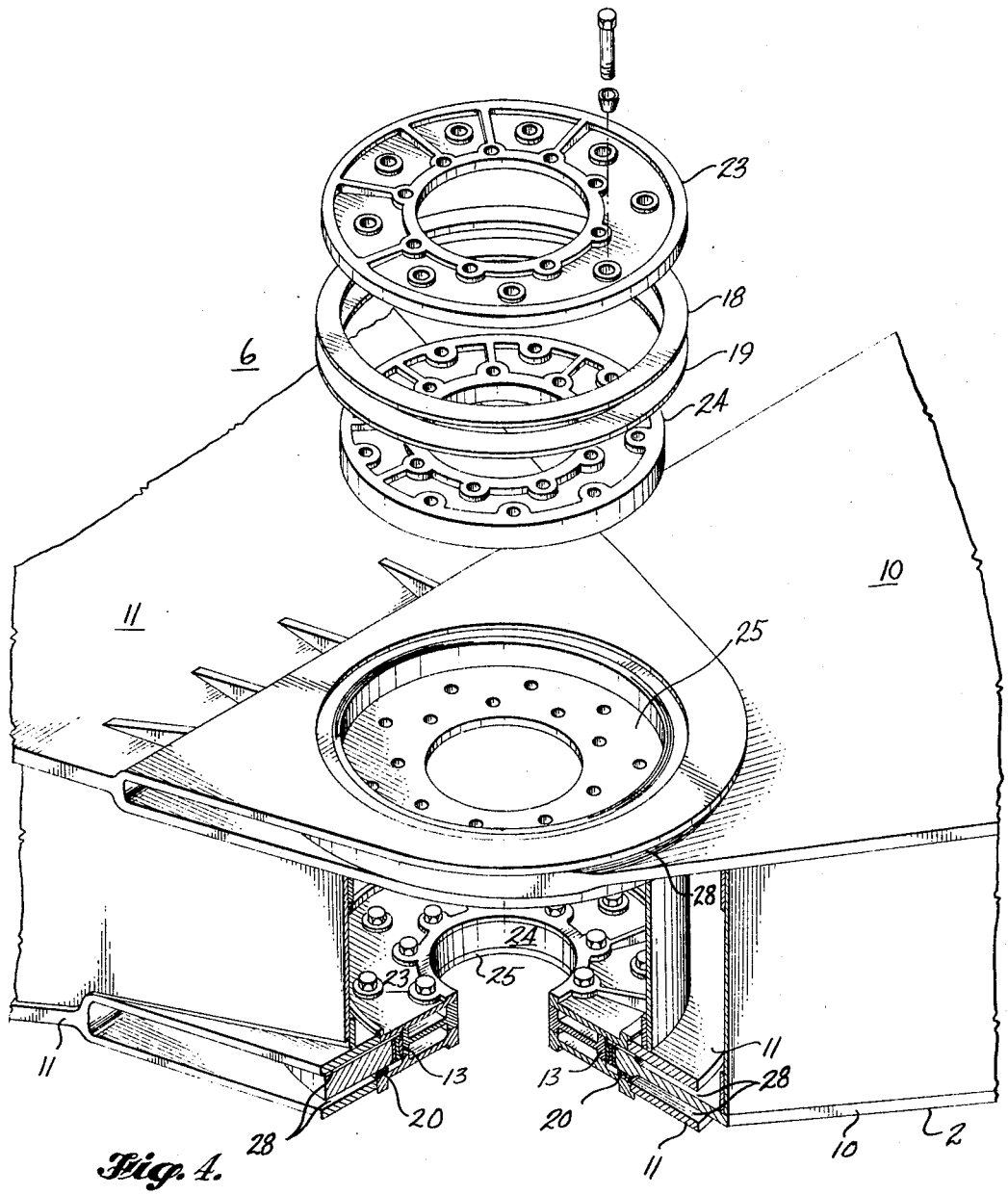
FIGURE 4 is an isometric view, wherein the inboard and outboard sections, as shown in FIGURE 3, are assembled and wherein the upper bearing arrangement is shown in an exploded section, while the lower bearing arrangement is shown cross-sectionwise.

FIGURE 4 shows the assembled arrangement of the male section 10 and female section 11 and the exploded view of the upper bearing arrangement 6 wherein the upper plate 23 and center plate 24 are shown exserted and the bottom bearing plate 25 inserted. The space 28 shown between the male and female sections 10 and 11 enables the variable sweep swing 2, and in particular the male section 10, to allow a certain amount of vertical movement without disturbing the female or inboard section 11 structure.

Figure 5:
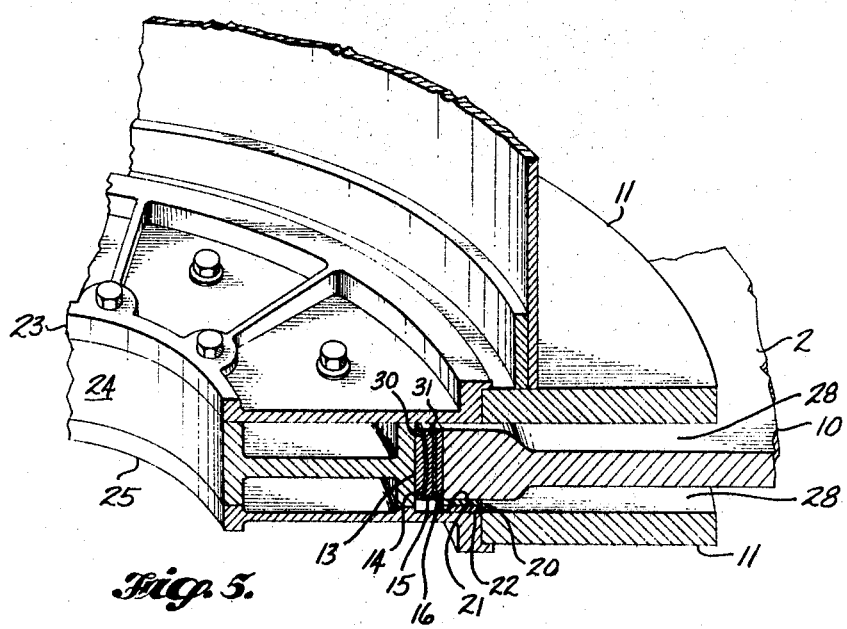
FIGURE 5 illustrates a section of the lower bearing arrangement in a simplified form and shows in particular the arrangement of the radial load liners in regard to the vertical thrust liners.

FIGURE 5 shows basically and in simplified form the assembly of the radial load liner arrangement 13, the thrust bearing arrangement 20, the stationary or female section 11 and the moveable or male section 10.

FIGURE 7 shows in an exaggerated fashion the lower bearing arrangement 6 and illustrates how the spherical race 14 and free rotating race 15 are excluded from the effect of a vertical downward thrust load.

An upward thrust load is not shown and deemed to be unnecessary since the effect is essentially the same in reversed direction and takes place in the upper bearing arrangement 7.

The liner surfaces 30 and 31 are made from a Teflon Fiberglas interwoven material of approximately 0.01–0.02 inch thickness and are bonded to the free rotating race 15.

The spherical race 14 is fixedly mounted on the center bearing plate 24 and the cylindrical race 16 is fixedly mounted on the male section 10.

Figure 6:
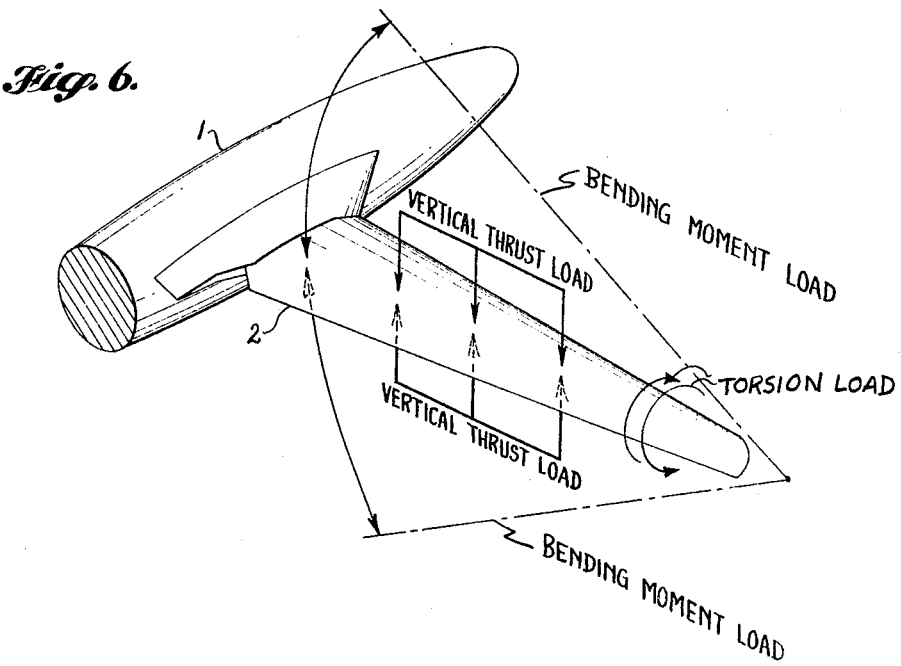
FIGURE 6 shows the three main loads that act upon the wing and which are compensated for in the unique bearing system.

The bearing system 5 enables the sweeping variable wing 2 to pivot at pivot 3. As will be understood most of the heavy loads encountered by the variable sweep wing will be oriented into the pivot 3. Referring to FIGURE 6, one heavy load will be the bending moment and the torsion of the wing which is taken care of by the radial load liner arrangements 12 and 13 while another heavy load comprises the vertical or thrust load which is taken care of by the upper thrust bearing arrangement 17 and the lower thrust bearing arrangement 20 as illustrated in FIGURES 2 and 7.

Maximum life and reliability are achieved by orientation of the load to the bearing in a manner which prevents eccentric and thrust loads due to deflections and manufacturing tolerances on radial wear surfaces. The pivot life is greatly increased by the use of the two bearing surfaces 30 and 31 mounted on the floating or free rotating race 15 and the unique ability of the race 15 to rotate and distribute the wear around the 360° of the surface. Rotation of the floating race 15 will occur only when the portion of the bearing under load begins to wear, and wear is evidenced by an increase in coefficient of friction which will cause the floating race 15 to rotate to an unworn section. In other words rotation or slideable movement between the spherical race 14 and free rotating race 15 might diminish by increased friction and thus the rotation is taken over on surface 31 between the free rotating race 15 and the cylindrical race 16 and vice versa. Thus the radial load liner arrangements 12 and 13 each consist of a spherical bearing surface 30 for self alignment and radial loads, and a cylindrical bearing surface 31 for vertical alignment and radial load. Both surfaces 30 and 31 are fixed to the free rotating race 15.

The spherical liner surface 30 allows the bearing to align to the radial load and prevent eccentric loading due to manufacturing tolerance and deflections. The liner surface 31 which is between the free rotating race 15 and cylindrical race 16 relieves the spherical race 14 of thrust load.

The thrust load will be taken on the thrust bearing arrangements 17 and 20.

The free rotating race 15 is free to rotate and will tend to distribute the wear around the entire periphery of the liner surface 30 and 31.

In general it has been shown that this unique construction allows for self alignment of the bearing which is accomplished in particular by the use of spherical race 14 and furthermore it has been shown that the spherical race 14 carries only the main radial loads without any effect of thrust load which is borne by separate thrust bearing arrangements 17 and 20, which unique arrangement extends the life span of the bearing system 5 and increases its reliability. Furthermore this bearing system 5 is practical to assemble and installation of the bearing assembly allows for acceptable tolerances, especially in mating the bearing to its support structures.

Having thus described the preferred embodiment of this invention it will be obvious that various other structural modifications may be contemplated by those skilled in the art without departing from the spirit and scope of the invention as hereinafter defined by the appended claims.

I claim:
1. Wing pivot means for aircraft having variable sweep wings, comprising in combination:
   (a) actuator means for moving the variable sweep wing in subsonic, transonic and supersonic position,
   (b) pivot means for rotation of the wing in each of said positions by action of said actuator,
   (c) said pivot means comprising two bearing arrangements spaced in substantially vertical relationship and having a common normal axis of rotation,
   (d) each of said bearing arrangements provided with a bearing surface being a ring shaped flat liner of a lubricating material mounted in perpendicular relationship about said axis of rotation for carrying thrust wing loads, and
   (e) each of said bearing arrangements further provided with a free floating circular shaped race rotationally positioned about said axis of rotation and said race having an outer face parallel with said axis of rotation and a convex shaped inner face, both said outer face and convex inner face coated with a thin lubricating material and mating with the bearing arrangement whereby said floating race in combination with said bearing arrangement is adapted to carry wing torsion and wing bending loads.

2. Wing pivot means for aircraft having variable sweep wings as claimed in claim 1 wherein said lubricating material is made of a 0.009–0.02 inch thick Teflon Fiberglas material.

3. Wing pivot means for aircraft having variable sweep wings, comprising in combination:
   (a) a bearing system mounted in the wing and having an upper and a lower bearing arrangement spaced in vertical relationship and positioned about a common normal axis of rotation,
   (b) each of said upper and lower bearing arrangements provided with a radial load bearing arrangements for carrying wing torsion and wing bending loads and each of said upper and lower bearing arrangements provided with a thrust bearing liner arrangement for carrying wing thrust shear loads,
   (c) said radial load bearing arrangements each having three concentric races being a first, second and third ring shaped race, positioned in an identical plane about said axis of rotation and perpendicular therewith, and having its second race free floating between said first race, fixedly mounted with said bearing arrangement, and said third race, fixedly mounted with said bearing arrangement,
   (d) a lubricating material fixedly attached to one of said races between said first and said second race and between said second and said third race, one of said concentric races having a convex surface mating with its adjacent race having a concave surface, and
   (e) said thrust bearing liner arrangement having at least one ring shaped liner fixedly mounted on said bearing arrangement made of aluminum bronze material positioned about said axis of rotation in a perpendicular plane thereof.

4. Wing pivot means for aircraft having variable sweep wings, as claimed in claim 3, wherein said lubricant material comprises a thin layer of Teflon Fiberglas material.

5. Wing pivot means for aircraft having variable sweep wings, as claimed in claim 3, wherein said second free floating race is adapted to provide free movement between said first race and said second floating race when free movement is seized between said second floating race and said third race and vice versa.

6. A bearing arrangement for variable sweep wing aircraft comprising in combination:
   (a) a bearing system having an upper and lower bearing assembly mounted in parallel relationship and about a common perpendicular axis of rotation,
   (b) said upper and lower bearing assemblies each comprising a stationary female section and movable male section,
   (c) an upper and lower race assembly each comprising three substantially concentric races, located between said female section and said male section in said upper and said lower bearing assembly respectively, for receiving radial loads applied to said bearing system,
   (d) each of said upper and lower race assemblies comprising a first race of diametric spherical section, a second free rotating mating race and a third race of cylindrical cross section,
   (e) said spherical race mounted on said female section and having its convex side on its outward face, said free rotating race having a mating concave side on its inner face, said cylindrical race disposed about said free rotating race and having its outer face fixedly mounted on said male section, and
   (f) a thin layer of Teflon Fiberglas frictionless bearing material fixedly mounted on said outer face and said convex mating inner face of said free rotating race for receiving radial and torsion loads.

7. A bearing arrangement for variable sweep wing aircraft as claimed in claim 6 wherein said free rotating mating race is adapted to provide movement between said first race and said free rotating mating race when friction of said radial loads increases and seize rotation between said free rotating mating race and said third race and vice versa.

8. A bearing arrangement for variable sweep wing aircraft comprising in combination:
   (a) a bearing system having an upper and lower bearing assembly mounted in parallel relationship and along a common perpendicular axis of rotation,
   (b) said upper and lower bearing assemblies each comprising a stationary female section and movable male section,
   (c) an upper and lower race assembly each comprising three substantially concentric races, located between said female section and said male section in said upper and lower bearing assembly respectively, for receiving radial loads applied to said bearing system,
   (d) each of said upper and lower race assemblies comprising a first race of diametric spherical section, a second free rotating mating race and a third race of cylindrical cross section,
   (e) said spherical race mounted on said female section and having its convex side on its outward face, said free rotating race having a mating concave side on its inner face, said cylindrical race disposed about said free rotating race and having its outer face fixedly mounted on said male section,
   (f) a thin layer of Teflon Fiberglas frictionless bearing material fixedly mounted on said outer face and said convex mating inner face of said free rotating race for receiving radial and torsion loads,
   (g) an upper thrust bearing arrangement having a first and second liner of substantially cylindrical cross section with equal diameters, for thrust load, received on said upper bearing assembly,
   (h) said first liner mounted on said female section and said second liner disposed and aligned under said first liner and mounted on said male section,
   (i) a lower thrust bearing arrangement having a lower first and a lower second liner of substantially cylindrical cross section with equal diameters, for thrust loads received on said upper bearing assembly, and
   (j) said first lower liner mounted on said male section and said second lower liner disposed and aligned under said first lower liner and mounted on said female section.

9. A bearing arrangement for variable sweep wing aircraft as claimed in claim 8 wherein said second free rotating race is adapted to provide frictionless movement between said second free rotating race and said spherical race when said motion is seized by increased friction between said second free rotating race and said cylindrical race and wherein said second free rotation race is adapted to provide free motion between said second free rotating race and said cylindrical race when motion is seized by increased friction between said second free rotating race and said spherical race.

10. A bearing arrangement for variable sweep wing aircraft as claimed in claim 8 wherein said liners are made of an aluminum bronze material.

References Cited by the Examiner
UNITED STATES PATENTS

| | | | |
|---|---|---|---|
| 797,600 | 8/1905 | Otis | 308—55 |
| 2,126,388 | 8/1938 | Hohe et al. | 308—72 |
| 2,794,608 | 6/1957 | Johnson | 244—46 |
| 2,961,196 | 11/1960 | Atkinson | 244—46 |
| 3,069,178 | 12/1962 | Rosen | 277—112 |

MILTON BUCHLER, *Primary Examiner.*

B. BELKIN, *Assistant Examiner.*